Figure 1:
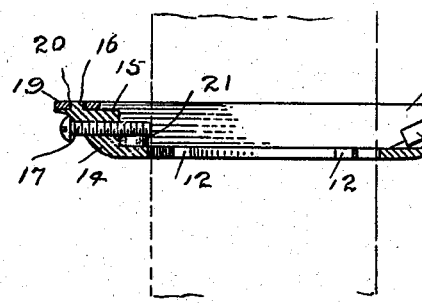

W. T. BROADBENT.
FLOOR AND CEILING PLATE.
APPLICATION FILED AUG. 20, 1908.

905,144.

Patented Dec. 1, 1908.

Witnesses:
H. A. Lamb
S. W. Atherton

Inventor
William T. Broadbent
By Attorney

UNITED STATES PATENT OFFICE.

WILLIAM T. BROADBENT, OF TORRINGTON, CONNECTICUT.

FLOOR AND CEILING PLATE.

No. 905,144.      Specification of Letters Patent.      Patented Dec. 1, 1908.

Application filed August 20, 1908. Serial No. 449,444.

*To all whom it may concern:*

Be it known that I, WILLIAM T. BROADBENT, a citizen of the United States, residing at Torrington, county of Litchfield, State of Connecticut, have invented a new and useful Floor and Ceiling Plate, of which the following is a specification.

This invention has for its object to provide a simple and inexpensive two-part ring-shaped floor and ceiling plate which may be easily and quickly put in place and removed, the parts of which shall be securely and firmly locked together either in or out of use and which may be quickly and securely locked to the pipe it incloses.

With these and other objects in view I have devised the novel floor and ceiling plate of which the following description in connection with the accompanying drawing is a specification, reference characters being used to indicate the several parts.

Figure 2:
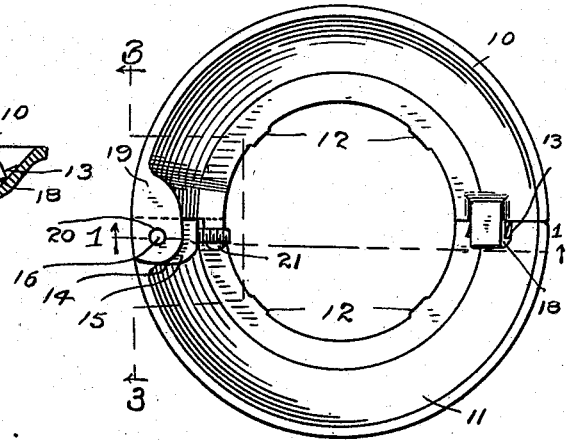
Figure 3:
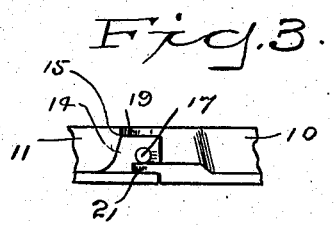
Figure 4:
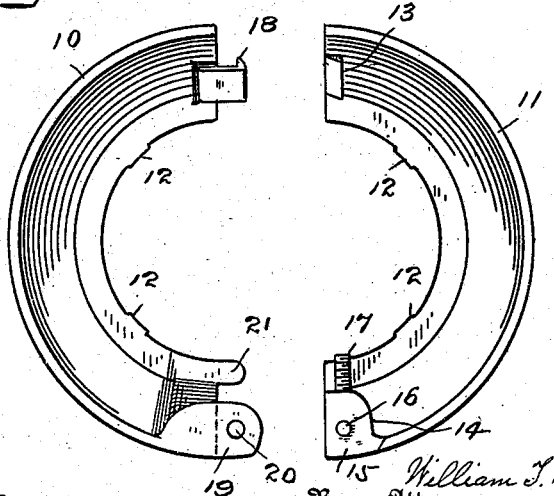

Figure 1 is a sectional view illustrating the use of my novel plate as a ceiling plate, the section line being indicated by 1—1 in Fig. 2, looking in the direction of the arrows; Fig. 2 an inverted plan view of my novel ceiling plate, the members being connected together as in use; Fig. 3 a detail sectional view on the line 3—3 in Fig. 2, looking in the direction of the arrows; and Fig. 4 is an inverted plan view of the members of the plate detached.

10 and 11 denote the members or parts of the plate. The plate, when the members are assembled, receives a pipe, indicated by dotted lines in Fig. 1, in the usual manner, the inner edge of the plate being provided with lugs 12 which bear against the pipe leaving air spaces between the plate and the pipe. Member 11 is provided at one end with a bevel-faced locking shoulder 13 and at the other end with a lug 14 having a flat face 15 slightly below the plane of the edge of the member, a pin 16 extending outward from the plane and a set screw 17 which passes through the lug transversely and is adapted to engage a pipe to retain the plate in place when used as a ceiling plate and also for another purpose presently to be explained.

Member 10 is provided at one end with a bevel-faced locking catch 18 which is adapted to engage the bevel-faced shoulder 13 on member 11, and at its other end with a plate 19 formed integral therewith and of a thickness corresponding with the height of the edge of the plate above face 15 on part 11, said plate being provided with a hole 20 which receives pin 16 on part 11. Member 10 is also provided with a lug 21 which is adapted to pass between the set screw and the inner face of the plate at its inner edge, just filling the space between the set screw and the plate so as to retain the members together and prevent looseness when assembled.

The operation is as follows: In clasping the members about a pipe, member 10 is placed in position, then the member 11 is placed in position with its pin 16 in engagement with hole 20 of member 10 and then member 11 is swung toward member 10, lug 21 on member 10 passing between the set screw and the inner face of member 11 near its inner edge, and locking shoulder 13 on member 11 sliding over the beveled face of the catch and the members springing to place with a snap when in alinement, thus securely locking the two members together. The members are disconnected by springing the end of the member having the locking shoulder slightly out of the plane of the member having the locking catch, so that said catch will be disengaged from the shoulder. The members may then be swung outward away from each other in the horizontal plane, and as soon as lug 21 on member 10 has passed out from under the set screw the members may be disconnected. When the plate is used as a floor plate it will not be necessary to tighten up the set screw. When used as a ceiling plate, the plate may be locked to a pipe by tightening up the set screw. It will be noted that the set screw performs the two functions of locking the plate in place when used as a ceiling plate and of co-acting with lug 21 in locking the members together. The lug and set screw are so positioned relatively to each other that the resiliency of the metal of the members will retain them locked in the engaged position and that the members must be sprung slightly out of alinement in the horizontal plane to permit their detachment from each other.

The closing of the members together causes the inner end of the screw 17 to engage the surface of the pipe and hold the entire device in position when the lugs 13 and 18 snap together. With the screw once properly adjusted, it need never be touched when the device is to be removed or repaired.

Having thus described my invention I claim:

1. A floor and ceiling plate comprising two members, one of said members being provided at one end with a lug having a depressed plane, a pin extending from said plane, and a transverse set screw, the corresponding end of the other member being provided with a plate engaging the plane, a hole to receive the pin and a lug to engage the side of the set screw whereby the members are retained in place when swung to the assembled position, the other end of said members being provided with means for locking them together with a snap.

2. A floor and ceiling plate comprising two members, one of said members being provided at one end with a lug having a depressed plane, a pin extending from said plane, and a transverse set screw, the corresponding end of the other member being provided with a plate engaging the plane, a hole to receive the pin and a lug to engage the side of the set screw, the other ends of said members being provided respectively with a bevel-faced locking lug and a bevel-faced catch whereby they are locked together with a snap.

In testimony whereof I affix my signature, in presence of two witnesses.

WILLIAM T. BROADBENT.

Witnesses:
 THOMAS MURRAY,
 WILLIAM F. PEETZ.